US012595274B2

(12) United States Patent
Saga

(10) Patent No.: US 12,595,274 B2
(45) Date of Patent: Apr. 7, 2026

(54) METHOD FOR MANUFACTURING ALKENYL PHOSPHORUS COMPOUND

(71) Applicant: MARUZEN PETROCHEMICAL CO., LTD., Tokyo (JP)

(72) Inventor: Yuta Saga, Ichihara (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 827 days.

(21) Appl. No.: 17/595,444

(22) PCT Filed: Nov. 26, 2020

(86) PCT No.: PCT/JP2020/043948

§ 371 (c)(1),
(2) Date: Nov. 17, 2021

(87) PCT Pub. No.: WO2021/106982

PCT Pub. Date: Jun. 3, 2021

(65) Prior Publication Data

US 2022/0227795 A1 Jul. 21, 2022

(30) Foreign Application Priority Data

Nov. 27, 2019 (JP) ................................ 2019-214698

(51) Int. Cl.
*C07F 9/53* (2006.01)
*B01J 31/24* (2006.01)

(52) U.S. Cl.
CPC ......... *C07F 9/5316* (2013.01); *B01J 31/2409* (2013.01)

(58) Field of Classification Search
CPC .... C07F 9/5316; C07F 9/4015; B01J 31/2409
See application file for complete search history.

(56) References Cited

U.S. PATENT DOCUMENTS

| | | | |
|---|---|---|---|
| 6,534,669 | B2 | 3/2003 | Henkelmann et al. |
| 2019/0263847 | A1 | 8/2019 | Kinami et al. |

FOREIGN PATENT DOCUMENTS

| | | | |
|---|---|---|---|
| JP | 2002-179691 | A | 6/2002 |
| JP | 2004-026655 | A | 1/2004 |
| JP | 2004-043492 | A | 2/2004 |
| JP | 2004-075688 | A | 3/2004 |
| JP | 2005-232067 | A | 9/2005 |
| JP | 2007-063168 | A | 3/2007 |
| JP | 2012-229211 | A | 11/2012 |
| JP | 5388856 | B2 | 1/2014 |
| WO | 2009/051025 | A1 | 4/2009 |
| WO | 2017/043552 | A1 | 3/2017 |

OTHER PUBLICATIONS

JP2004026655A (Kan et al., Original Document merged with Machine Translation).*
Catal. Sci. Technol. 2019, 9, 5504 (Gallen et al.).*
RSC. Adv. 2017, 7, 18707 (Fortunato et al.).*
Adv. Synth. Catal. 2010, 352, 2979 (Ananikov et al.).*
Adv. Synth. Catal. 2010, 352, 2979-2992 (Ananikov et al.) (Year: 2010).*
Catal. Sci. Technol. 2019, 9, 5504-5561 (Gallen et al. Sep. 5, 2019) (Year: 2019).*
RSC Adv. 2017, 7, 18707-18713 (Fortunato et al.) (Year: 2017).*
JP 2004 026655 A (Kan et al., Original Document merged with English language machine translation) (Year: 2004).*
International Search Report and Written Opinion (Application No. PCT/JP2020/043948) dated Jan. 26, 2021 (with English translation).
Li-Biao Han, et al., "Efficient and Selective Nickel-Catalyzed Addition of H—P(O) and H—S Bonds to Alkynes," Journal of American Chemical Society, Mar. 30, 2004, vol. 126, No. 16, pp. 5080-5081.
Chinese Office Action (Application No. 202080006747.1) dated Jun. 28, 2023 (with English translation) (17 pages).
English translation of the International Preliminary Report on Patentability (Chapter I) dated Jun. 9, 2022 (Application No. PCT/JP2020/043948).
Japanese Office Action (with English translation) dated May 31, 2024 (Application No. 2021-510248).
Extended European Search Report (Application No. 20894791.1) dated Feb. 14, 2023.

* cited by examiner

*Primary Examiner* — Amy C Bonaparte
*Assistant Examiner* — Derek Rhoades
(74) *Attorney, Agent, or Firm* — BURR PATENT LAW, PLLC

(57) ABSTRACT

[Problem]
To provide an alkenyl phosphorus compound.
[Means to Solve the Problem]
The method for manufacturing an alkenyl phosphorus compound according to the present invention is a method in which a specific phosphorus compound and a specific alkynyl compound are reacted in the presence of a transition metal complex and a Lewis acid, thereby giving an alkenyl phosphorus compound.

9 Claims, No Drawings

METHOD FOR MANUFACTURING ALKENYL PHOSPHORUS COMPOUND

BACKGROUND OF THE INVENTION

Field of the Invention

The present invention relates to a method for manufacturing an alkenyl phosphorus compound. More particularly, the present invention relates to a method for manufacturing an alkenyl phosphorus compound by a hydrophosphorylation reaction using a transition metal complex.

Background Art

An organophosphorus compound is a chemical substance widely used in various products such as a flame-retardant, a plasticizer, an insecticide, medical and agrochemical agents, a ligand of a metallic complex. Recently, organophosphorus compounds have been drawing attention industrially in the fields of constituting materials and electronic materials such as a metal surface treatment agent and a flame-retardant resin as functional materials.

SUMMARY OF THE INVENTION

Among the organophosphorus compounds, a phosphonic acid derivative is a useful precursor substance for the various chemicals described above, and therefore, various manufacturing methods have been studied conventionally. For example, a phosphonic acid derivative has been manufactured by addition reaction of P(O)—H bond of phosphonic acid to alkynes using a catalyst (hereinafter referred to as hydrophosphorylation reaction). For example, in Patent Document 1, it is proposed to manufacture a phosphonic acid derivative by using a phosphonic acid diester compound of which a part had been hydrolyzed beforehand as a raw material. Further, in Non-Patent Document 1, it is proposed that a phosphonic acid derivative is produced by using various zero valent nickel catalysts.

PRIOR ART DOCUMENTS

Patent Document 1: WO2017/043552
Non-Patent Document 1: J. AM. CHEM. SOC. 2004, 126, 5080-5081

SUMMARY OF THE INVENTION

Problems to be Solved by the Invention

However, there were problems that under the reaction conditions described in Patent Document 1, hydrolysis reaction must be carried out as a pretreatment and one additional step is required, or that on one hand the reaction has to be carried out at a low temperature, a large amount of reaction heat is generated so it is difficult to control the temperature in order to produce in a large amount. In addition, the catalyst used for the hydrophosphorylation reaction is expensive, unstable, flammable, and has malodor, and a safe and inexpensive catalyst had been desired. On the other hand, although Non-Patent Document 1 discloses that the hydrophosphorylation reaction was carried out with a nickel complex using inexpensive triphenylphosphine, the reactivity was low, and the phosphonic acid derivative was only obtained with a low yield even with a large amount of catalyst. Further, there was a problem that the option of the raw materials was narrow because many of the phosphine compounds and nickel compounds are not easily obtainable in the industry.

Therefore, the problem of the present invention is to provide a method for manufacturing an alkenyl phosphorus compound which allows to proceed the hydrophosphorylation reaction efficiently at room temperature to mild heating by using a divalent nickel compound which is a raw material easily obtained in the industry, stable in the air, and inexpensive, and phosphine which is stable in the air and inexpensive, and adjusting the catalyst in the reaction system.

Means for Solving the Problem

As a result of intensive studies to solve the above problem, the present inventors have found that an alkenylphosphorus compound can be efficiently manufactured by performing a hydrophosphorylation reaction between a specific phosphorus compound and a specific alkynyl compound in the presence of a transition metal complex and a Lewis acid, and have thus completed the present invention.

That is, according to the present invention, the following inventions are provided.

[1] A method for manufacturing an alkenylphosphorus compound by reacting a phosphorus compound represented by the following general formula (1):

(1)

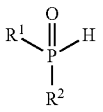

wherein $R^1$ and $R^2$ each independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group. In addition, $R^1$ and $R^2$ may be bonded to each other to form a cyclic structure;

and an alkynyl compound represented by the following general formula (2):

(2)

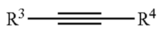

wherein $R^3$ and $R^4$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heteroaryl group, a substituted or unsubstituted alkenyl group, a substituted or unsubstituted alkoxy group, a substituted or unsubstituted aryloxy group, or a substituted or unsubstituted silyl group, in the presence of a transition metal complex and a Lewis acid, wherein the alkenyl phosphorus compound is represented by the following general formula (3):

(3)

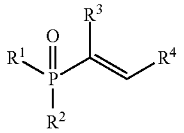

wherein, $R^1$ and $R^2$ are synonymous with $R^1$ and $R^2$ in general formula (1), and $R^3$ and $R^4$ are synonymous with $R^3$ and $R^4$ in general formula (2).

[2] The manufacturing method according to [1], wherein the transition metal complex is a complex of nickel.

[3] The manufacturing method according to [2], wherein the transition metal complex is a zero valent nickel complex of nickel and phosphines.

[4] The manufacturing method according to [3], wherein the phosphines are phosphines having an aromatic substituent.

[5] The manufacturing method according to [1] to [4], wherein the Lewis acid is a metal compound.

[6] The manufacturing method according to [5], wherein the metal compound is at least one compound selected from the group consisting of zinc chloride, zinc bromide, and iron (II) chloride.

[7] The manufacturing method according to [1] to [6], wherein $R^1$ and $R^2$ in general formulae (1) and (3) are each independently a substituted or unsubstituted alkoxy group or a substituted or unsubstituted aryl group having 1 to 10 carbons.

[8] The manufacturing method according to [1] to [7], wherein $R^3$ and $R^4$ in general formulae (2) and (3) are each independently a substituted or unsubstituted alkyl group or a substituted or unsubstituted aryl group or a substituted or unsubstituted aralkyl group having 1 to 10 carbons.

[9] The manufacturing method according to [1] to [8], wherein the reaction is carried out at 20° C. to 60° C.

Effect of the Invention

According to the present invention, an alkenyl phosphorus compound can be efficiently produced by performing a hydrophosphorylation reaction of a specific phosphorus compound and a specific alkynyl compound in the presence of a transition metal complex and a Lewis acid. In particular, the hydrophosphorylation reaction can be efficiently performed under a heating temperature condition of equal to or higher than room temperature.

Method for Producing Alkenyl Phosphorus Compound

Hydrophosphorylation Reaction

The method for producing an alkenyl phosphorus compound of the present invention is a method in which an alkenyl phosphorus compound is produced by a hydrophosphorylation reaction of a phosphorus compound and an alkynyl compound as raw materials in the presence of a transition metal complex and a Lewis acid as catalysts. According to the method for producing an alkenyl phosphorus compound of the present invention, the alkenyl phosphorus compound can be efficiently synthesized under the heating temperature condition of equal to or higher than the room temperature.

Phosphorus Compound

A phosphorus compound represented by the following general formula (1) can be used as a raw material for the hydrophosphorylation reaction.

(1)

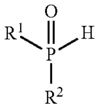

wherein $R^1$ and $R^2$ each independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group. In addition, $R^1$ and $R^2$ may be bonded to each other to form a cyclic structure.

In general formula (1), the number of carbons of the alkyl group, alkoxy group, cycloalkyl group, aralkyl group, aryl group, and aryloxy group of $R^1$ and $R^2$ is preferably 1 to 10. The number of carbons above does not include the number of carbons of the substituent. Examples of $R^1$ and $R^2$ include alkyl groups such as a methyl group, ethyl group, propyl group, isopropyl group, n-butyl group, isobutyl group, sec-butyl group, pentyl group, and hexyl group; alkoxy groups such as a methoxy group, ethoxy group, and butoxy group; cycloalkyl groups such as a cyclohexyl group; aralkyl groups such as a benzyl group and phenethyl group; aryl groups such as a phenyl group, tolyl group, xylyl group, and naphthyl group; and aryloxy groups such as a phenoxy group. Among these, $R^1$ and $R^2$ are each independently preferably a substituted or unsubstituted alkoxy group.

In general formula (1), examples of the substituent which $R^1$ and $R^2$ may have include an alkyl group, cycloalkyl group, alkoxy group, cycloalkoxy group, heterocyclic group, alkylidene group, silyl group, acyl group, acyloxy group, carboxyl group, cyano group, nitro group, hydroxy group, mercapto group, and oxo group. The number of carbons contained in the substituent is preferably from 1 to 6, more preferably from 1 to 4, and further preferably from 1 to 3.

Alkynyl Compound

Alkynyl compounds represented by the following general formula (2) can be used as the raw material for the hydrophosphorylation reaction.

(2)

In general formula (2), $R^3$ and $R^4$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heteroaryl group, a substituted or unsubstituted alkenyl group, a substituted or unsubstituted alkoxy group, a substituted or unsubstituted aryloxy group, or a substituted or unsubstituted silyl group.

In general formula (2), the alkyl group, cycloalkyl group, aralkyl group, aryl group, heteroaryl group, alkenyl group, alkoxy group, and aryloxy group of $R^3$ and $R^4$ preferably have 1 to 10 carbons. The number of carbons above does not include the number of carbons of the substituent. Examples of $R^3$ and $R^4$ include an alkyl group such as a methyl group, ethyl group, propyl group, isopropyl group, n-butyl group, isobutyl group, sec-butyl group, pentyl group, hexyl group; cycloalkyl group such as a cyclohexyl group; an aralkyl group such as a benzyl group and phenethyl group; an aryl group such as a phenyl group, tolyl group, xylyl group, and naphthyl group; an alkenyl group such as a 1-butenyl group, 2-butenyl group, 1,3-butadienyl group, pentenyl group, and hexenyl group; an alkoxy group such as a methoxy group, ethoxy group, and butoxy group; and an aryloxy group such as a phenoxy group. Among these, $R^3$ and $R^4$ are each independently preferably a substituted or unsubstituted alkyl group, a substituted or unsubstituted aryl group, or a substituted or unsubstituted aralkyl group having 1 to 10 carbons.

In general formula (2), examples of the substituent which $R^3$ and $R^4$ may include an alkyl group, cycloalkyl group, alkoxy group, cycloalkoxy group, heterocyclic group, alkylidene group, silyl group, acyl group, acyloxy group, carboxyl group, cyano group, nitro group, hydroxy group, mercapto group, and oxo group. The number of carbons contained in the substituent is preferably from 1 to 6, more preferably from 1 to 4, and further preferably from 1 to 3.

The mass ratio of the phosphorus compound represented by general formula (2) to the alkynyl compound represented by general formula (3) as the raw materials for the hydrophosphorylation reaction is preferably 10:1 to 0.1:1, more preferably 3:1 to 0.7:1, and further preferably 1.1:1 to 0.9:1.

Transition Metal Complex (Catalyst)

A transition metal complex can be used as a catalyst for the hydrophosphorylation reaction. Examples of the transition metal complex include a nickel complex, and a zero valent nickel complex is preferable.

The nickel complex as above is preferably a nickel complex of nickel and phosphines. As the phosphine, a phosphine having an aromatic substituent is preferable. Examples of the phosphine having an aromatic substituent include triphenylphosphine, 1,2-diphenylphosphinoethane, 1,3-diphenylphosphinopropane, 1,4-diphenylphosphinobutane, diphenylmethylphosphine, tri(2-methylphenyl)phosphine, tri(3-methylphenyl)phosphine, tri(4-methylphenyl) phosphine, and the like. The phosphine having an aromatic substituent is inexpensive, can be easily handled in the air, and thus the manufacturing cost can be reduced and the manufacturing efficiency can be improved.

Lewis Acid

A metal compound can be used as the Lewis acid used for the hydrophosphorylation reaction. Examples of the metal compound include zinc chloride, zinc bromide, iron (II) chloride, and the like. Addition of a Lewis acid to the hydrophosphorylation reaction can exhibit catalytic activity near room temperature, improve the reaction rate and the conversion ratio of the phosphorus compound as the raw material to the alkenyl phosphorus compound.

Reaction Conditions

The amount of transition metal complex (catalyst) used in the hydrophosphorylation reaction is not particularly limited as long as the reaction proceeds sufficiently, and is preferably 0.01 to 10 mol, more preferably 0.1 to 5.0 mol, and further preferably 0.5 to 2.0 mol per 1 mol of the phosphorus compound as the raw material.

The amount of Lewis acid used in the hydrophosphorylation reaction is not particularly limited as long as the reaction proceeds sufficiently, and is preferably 1 to 30 mol, more preferably 2 to 10 mol, and further preferably 3 to 5 mol per 1 mol of the transition metal complex. The amount of Lewis acid being within the above ranges can increase the activation temperature of the catalysts in the hydrophosphorylation reaction and improve the reaction rate greatly, so that the conversion ratio of the raw material, phosphorus compound to the alkenyl phosphorus compound can be improved.

The reaction temperature of the hydrophosphorylation reaction is not particularly limited, and is preferably 10 to 70° C., more preferably 20 to 55° C., and further preferably 30 to 45° C., taking into consideration of reaction efficiency, reaction rate, and by-products. The reaction temperature being within the above ranges can improve the reaction rate of the hydrophosphorylation reaction and the conversion ratio of the phosphorus compound as the raw material to the alkenyl phosphorus compound.

The reaction time of the hydrophosphorylation reaction is not particularly limited, and is preferably from 5 minutes to 48 hours, more preferably from 30 minutes to 24 hours, and further preferably from 1 to 8 hours, taking into consideration of reaction efficiency, reaction rate, and by-products. The reaction time being within the above-described ranges can make the hydrophosphorylation reaction proceed sufficiently, and improve the conversion ratio of the phosphorus compound as the raw material to the alkenyl phosphorus compound.

The hydrophosphorylation reaction may be carried out either in the presence or absence of an organic solvent; however, it is preferably carried out in the absence of a solvent. The hydrophosphorylation reaction can proceed by mild heating using the solvent-free method. The solvent-free method eliminates the solvent removal step after the reaction has completed, thereby reducing the manufacturing cost. The organic solvent is not particularly limited, and examples thereof include alcohols, ethers, hydrocarbons, ketones, esters, aromatic hydrocarbons, and the like.

The hydrophosphorylation reaction is preferably carried out under an inert gas atmosphere, taking into consideration of reaction efficiency, reaction rate, and by-products. Preferred for use as the inert gas are use nitrogen, argon, and the like.

The conversion of the phosphorus compound to the alkenyl phosphorus compound by the hydrophosphorylation reaction is preferably 40% or more, more preferably 50% or more, further preferably at least 60% or more, and further more preferably 80% or more. The conversion of the phosphorus compound to the alkenyl phosphorus compound being equal to or higher than the above-mentioned values can make the raw materials be efficiently utilized, reduce the manufacturing cost, and improve the manufacturing efficiency.

Alkenyl Phosphorus Compound

In the present invention, an alkenyl phosphorus compound represented by the following general formula (3) can be obtained by the hydrophosphorylation reaction.

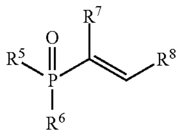

(3)

In general formula (3), $R^5$ and $R^6$ are synonymous with $R^5$ and $R^6$ in general formula (2), and $R^7$ and $R^8$ are synonymous with $R^7$ and $R^8$ in general formula (2).

EXAMPLES

The present invention shall be described in details below with reference to the Examples and Comparative Examples; however, the present invention shall not be limited to these Examples.

Synthesis of Alkenyl Phosphorus Compound

Example 1

1.35 mmol of bis(triphenylphosphine)nickel (II) dichloride, 1.35 mmol of zinc powder, and 2.7 mmol of triphenylphosphine were metered in a glass Schlenk tube and the container was substituted with nitrogen. To this was added 1.5 mL of acetone, and the mixture was heated and stirred at 40° C. for 3 hours to obtain an orange precipitate. The pressure in the flask was reduced, acetone was removed from the precipitate, and subsequently 90 mol of a phosphorus compound ($(MeO)_2P(O)H$) and 2.7 mmol of zinc chloride were added, and the mixture was stirred at 40° C. for 4 hours in an acetylene gas atmosphere to obtain an alkenyl compound $(MeO)_2P(O)CH{=}CH_2$. The conversion rate from the phosphorus compound to the alkenyl phosphorus compound was 81%.

Example 2

An alkenyl phosphorus compound ($(MeO)_2P(O)CH{=}CH_2$) was obtained in the same manner as in Example 1 except that the reaction time was changed to 6 hours. The conversion rate from the phosphorus compound to the alkenyl phosphorus compound was 95%.

was changed to 18 hours. The conversion rate from the phosphorus compound to the alkenyl phosphorus compound was 54%.

Example 5

An alkenyl phosphorus compound ($(MeO)_2P(O)CH{=}CH_2$) was obtained in the same manner as in Example 4 except that the reaction temperature was changed to 50° C. The conversion rate from the phosphorus compound to the alkenylphosphorus compound was 82%.

Comparative Example 1

1.35 mmol of 1,5-bis(cyclooctadiene)nickel (O), 5.4 mmol of triphenylphosphine, and 1.5 mL of acetone were added to a glass Schlenk tube, and the mixture was heated and stirred at 40° C. for 3 hours to obtain an orange precipitate. The pressure in the flask was reduced, acetone was removed from the precipitate, then 90 mol of a phosphorus compound ($(MeO)_2P(O)H$) was added, and the mixture was stirred at 40° C. for 4 hours in an acetylene gas atmosphere, thereby obtaining an alkenyl compound $(MeO)_2P(O)CH{=}CH_2$. The conversion rate from the phosphorus compound to the alkenyl phosphorus compound was 27%.

Comparative Example 2

When the reaction time in Comparative Example 1 was changed to 18 hours, the conversion rate from the phosphorus compound to the alkenyl phosphorus compound was 27%.

The results of Examples 1-5 and Comparative Example 1 are listed in Table 1.

TABLE 1

| | Starting Substance (Phosphorus Compound) | Starting Substance (Alkynyl Compound) | Type of Lewis Acid | Addition Amount of Catalyst of Lewis Acid (eq) | Reaction Temperature (° C.) | Reaction Time (hours) | Synthesized Substance (Alkenyl Phosphorus Compound) | Conversion Rate (%) |
|---|---|---|---|---|---|---|---|---|
| Ex. 1 | $(MeO)_2P(O)H$ | Acetylene | $ZnCl_2$ | 3 | 20-25 | 4 | $(MeO)_2P(O)CH{=}CH_2$ | 81 |
| Ex. 2 | $(MeO)_2P(O)H$ | Acetylene | $ZnCl_2$ | 3 | 20-25 | 6 | $(MeO)_2P(O)CH{=}CH_2$ | 95 |
| Ex. 3 | $(MeO)_2P(O)H$ | Acetylene | $ZnCl_2$ | 5 | 20-25 | 4 | $(MeO)_2P(O)CH{=}CH_2$ | 98 |
| Ex. 4 | $(MeO)_2P(O)H$ | Acetylene | $ZnCl_2$ | 1 | 20-25 | 18 | $(MeO)_2P(O)CH{=}CH_2$ | 54 |
| Ex. 5 | $(MeO)_2P(O)H$ | Acetylene | $ZnCl_2$ | 1 | 50 | 4 | $(MeO)_2P(O)CH{=}CH_2$ | 82 |
| Comp. Ex. 1 | $(MeO)_2P(O)H$ | Acetylene | — | 0 | 20-25 | 4 | $(MeO)_2P(O)CH{=}CH_2$ | 27 |
| Comp. Ex. 2 | $(MeO)_2P(O)H$ | Acetylene | — | 0 | 20-25 | 18 | $(MeO)_2P(O)CH{=}CH_2$ | 27 |

Example 3

An alkenyl phosphorus compound ($(MeO)_2P(O)CH{=}CH_2$) was obtained in the same manner as in Example 1 except that 5.4 mmol of zinc chloride was used as the Lewis acid. The conversion rate from the phosphorus compound to the alkenyl phosphorus compound was 98%.

Example 4

An alkenyl phosphorus compound ($(MeO)_2P(O)CH{=}CH_2$) was obtained in the same manner as in Example 1 except that only 1.35 mmol of zinc chloride precipitated as a by-product in the preparation of the zero valent nickel complex was used as the Lewis acid and the reaction time

Example 6

An alkenyl phosphorus compound ($(MeO)_2P(O)CH{=}CH_2$) was obtained in the same manner as in Example 1 except that 1.35 mmol of nickel chloride was used instead of bis(triphenylphosphine)nickel (II) dichloride, and the amount of triphenylphosphine used was changed to 5.4 mmol. The conversion rate from the phosphorus compound to the alkenyl phosphorus compound was 94%.

Example 7

An alkenyl phosphorus compound ($(MeO)_2P(O)CH{=}CH_2$) was obtained in the same manner as in Example 6 except that 2.70 mmol of 1,4-diphenylphosphinobutane (dppb) was used instead of triphenylphosphine. The conversion rate from the phosphorus compound to the alkenyl phosphorus compound was 64%.

Example 8

An alkenyl phosphorus compound ($(MeO)_2P(O)CH{=}CH_2$) was obtained in the same manner as in Example 6 except that 5.40 mmol of diphenylmethylphosphine was used in place of triphenylphosphine. The conversion rate from the phosphorus compound to the alkenyl phosphorus compound was 40%.

Example 9

An alkenyl phosphorus compound ($(MeO)_2P(O)CH{=}CH_2$) was obtained in the same manner as in Example 6, except that 4.05 mmol of iron (II) chloride ($FeCl_2$) was used as a Lewis acid. The conversion rate from the phosphorus compound to the alkenyl phosphorus compound was 41%.

Example 10

An alkenyl phosphorus compound ($(MeO)_2P(O)CH{=}CH_2$) was obtained in the same manner as in Example 6 except that 4.05 mmol of zinc bromide ($ZnBr_2$) was used as the Lewis acid. The conversion rate from the phosphorus compound to the alkenyl phosphorus compound was 51%.

A list of the results of Examples 6 to 10 are listed in Table 2.

metered in a glass Schlenk tube, and the container was substituted with nitrogen. To this, 1.5 mL of acetone was added, and the mixture was heated and stirred at 40° C. for 3 hours to obtain an orange precipitate. The pressure in the flask was reduced, acetone was distilled off from the precipitate, then 15 mol of a phosphorus compound ($(MeO)_2P(O)H$), 0.45 mmol of zinc chloride, and 15 mmol of 1-octyne were added, and the mixture was stirred at 40° C. for 4 hours to obtain an alkenyl compound (a mixture of $(MeO)_2P(O)C(C_6H_{13}){=}CH_2$ and $(MeO)_2P(O)CH{=}CHC_6H_{13}$). The conversion of the phosphorus compound to the alkenyl phosphorus compound was 97%.

Example 13

An alkenyl compound (a mixture of $Ph_2P(O)C(C_6H_{13}){=}CH_2$ and $Ph_2P(O)CH{=}CHC_6H_{13}$) was obtained in the same manner as in Example 12, except that 15 mmol of diphenylphosphine oxide ($Ph_2P(O)H$) was used as a phosphorus compound, 0.9 mmol of triphenylphosphine was used as a phosphine, and 6 mL of THF was used as a solvent. The conversion of the phosphorus compound to the alkenyl compound was 100%.

Comparative Example 3

0.225 mmol of bis (1,5-cyclopentadiene)nickel and 0.9 mmol of triphenylphosphine were metered in a glass Schlenk tube under a nitrogen atmosphere, 1 mL of THF was

TABLE 2

| | Starting Substance (Phosphorus Compound) | Starting Substance (Alkynyl Compound) | Type of Phosphine | Type of Lewis Acid | Synthesized Substance (Alkenyl Phosphorus Compound) | Conversion Rate (%) |
|---|---|---|---|---|---|---|
| Ex. 6 | $(MeO)_2P(O)H$ | Acetylene | $PPh_3$ | $ZnCl_2$ | $(MeO)_2P(O)CH{=}CH_2$ | 94 |
| Ex. 7 | $(MeO)_2P(O)H$ | Acetylene | dppb | $ZnCl_2$ | $(MeO)_2P(O)CH{=}CH_2$ | 64 |
| Ex. 8 | $(MeO)_2P(O)H$ | Acetylene | $PMePh_2$ | $ZnCl_2$ | $(MeO)_2P(O)CH{=}CH_2$ | 40 |
| Ex. 9 | $(MeO)_2P(O)H$ | Acetylene | $PPh_3$ | $FeCl_2$ | $(MeO)_2P(O)CH{=}CH_2$ | 41 |
| Ex. 10 | $(MeO)_2P(O)H$ | Acetylene | $PPh_3$ | $ZnBr_2$ | $(MeO)_2P(O)CH{=}CH_2$ | 51 |

Example 11

An alkenyl phosphorus compound ($Ph_2P(O)CH{=}CH_2$) was obtained in the same manner as in Example 6 except that 90 mmol of diphenylphosphine oxide ($Ph_2P(O)H$) as the phosphorus compound and 54 mL of tetrahydrofuran (THF) were used. The conversion rate from the phosphorus compound to the alkenyl phosphorus compound was 100%.

Example 12

0.225 mmol of nickel chloride, 0.225 mmol of zinc powder, and 0.9 mmol of methyldiphenylphosphine were added, and the mixture was stirred at room temperature for 3 hours to obtain an orange precipitate. The precipitate was washed with 1 mL of n-hexane three times, dried under reduced pressure, and a catalyst was prepared. The entire amount of this catalyst, 15 mmol of diphenylphosphine oxide ($Ph_2P(O)H$), 15 mmol of 1-octyne and 6 mL of THF were added and the mixture was stirred at 40° C. for 4 hours to give an alkenyl compound (a mixture of $Ph_2P(O)C(C_6H_{13}){=}CH_2$ and $Ph_2P(O)CH{=}CHC_6H_{13}$). The conversion of the phosphorus compound to the alkenyl phosphorus compound was 15%.

The results of Examples 11-13 and Comparative Example 3 are listed in Table 3.

TABLE 3

| | Starting Substance (Phosphorus Compound) | Starting Substance (Alkynyl Compound) | Type of Phosphine | Type of Lewis Acid | Synthesized Substance (Alkenyl Phosphorus Compound) | Conversion Rate (%) |
|---|---|---|---|---|---|---|
| Ex. 11 | $Ph_2P(O)H$ | Acetylene | $PPh_3$ | $ZnCl_2$ | $Ph_2P(O)CH{=}CH_2$ | 100 |
| Ex. 12 | $(MeO)_2P(O)H$ | 1-octyne | $PMePh_2$ | $ZnCl_2$ | $(MeO)_2P(O)CH{=}CHC_6H_{13}$<br>$(MeO)_2P(O)C(C_6H_{13}){=}CH_2$ | 97 |

TABLE 3-continued

| | Starting Substance (Phosphorus Compound) | Starting Substance (Alkynyl Compound) | Type of Phosphine | Type of Lewis Acid | Synthesized Substance (Alkenyl Phosphorus Compound) | Conversion Rate (%) |
|---|---|---|---|---|---|---|
| Ex. 13 | $Ph_2P(O)H$ | 1-octyne | $PPh_3$ | $ZnCl_2$ | $Ph_2P(O)CH{=}CHC_6H_{13}$ $Ph_2P(O)C(C_6H_{13}){=}CH_2$ | 100 |
| Comp. Ex. 3 | $Ph_2P(O)H$ | 1-octyne | $PPh_3$ | — | $Ph_2P(O)CH{=}CHC_6H_{13}$ $Ph_2P(O)C(C_6H_{13}){=}CH_2$ | 15 |

The invention claimed is:

1. A method for manufacturing an alkenyl phosphorus compound by reacting a phosphorus compound represented by the following general formula (1):

(1)

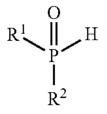

wherein $R^1$ and $R^2$ each independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group; and $R^1$ and $R^2$ may be bonded to each other to form a cyclic structure;

and an alkynyl compound represented by the following general formula (2):

(2)

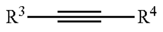

wherein $R^3$ and $R^4$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heteroaryl group, a substituted or unsubstituted alkenyl group, a substituted or unsubstituted alkoxy group, a substituted or unsubstituted aryloxy group, or a substituted or unsubstituted silyl group, in the presence of a transition metal complex and a Lewis acid, wherein the Lewis acid is at least one metal compound selected from the group consisting of zinc chloride, zinc bromide, and iron (II) chloride, and the amount of Lewis acid is 3 to 30 mol per 1 mol of the transition metal complex, wherein the alkenyl phosphorus compound is represented by the following general formula (3):

(3)

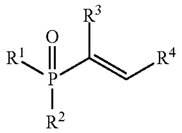

wherein, $R^1$ and $R^2$ are synonymous with $R^1$ and $R^2$ in general formula (1), and $R^3$ and $R^4$ are synonymous with $R^3$ and $R^4$ in general formula (2), and wherein the conversion of the phosphorus compound to the alkenyl phosphorus compound is 40% or more.

2. The manufacturing method according to claim 1, wherein the transition metal complex is a complex of nickel.

3. The manufacturing method according to claim 2, wherein the transition metal complex is a zero valent nickel complex of nickel and phosphines.

4. The manufacturing method according to claim 3, wherein the phosphines are phosphines having an aromatic substituent.

5. The manufacturing method according to claim 1, wherein $R^1$ and $R^2$ in general formulae (1) and (3) are each independently a substituted or unsubstituted alkoxy group or a substituted or unsubstituted aryl group having 1 to 10 carbons.

6. The manufacturing method according to claim 1, wherein $R^3$ and $R^4$ in general formulae (2) and (3) are each independently a substituted or unsubstituted alkyl group or a substituted or unsubstituted aryl group or a substituted or unsubstituted aralkyl group having 1 to 10 carbons.

7. The manufacturing method according to claim 1, wherein the reaction is carried out at 20° C. to 60° C.

8. The manufacturing method according to claim 1, wherein the conversion of the phosphorus compound to the alkenyl phosphorus compound is 80% or more.

9. The manufacturing method according to claim 1, wherein the amount of Lewis acid is 3 to 10 mol per 1 mol of the transition metal complex.

* * * * *